United States Patent
Huang

(10) Patent No.: US 12,436,542 B2
(45) Date of Patent: Oct. 7, 2025

(54) ANTI-COLLISION SYSTEM FOR AN AIRCRAFT AND AIRCRAFT INCLUDING THE ANTI-COLLISION SYSTEM

(71) Applicant: AIRBUS (BEIJING) ENGINEERING CENTRE COMPANY LIMITED, Beijing (CN)

(72) Inventor: Jinming Huang, Beijing (CN)

(73) Assignee: AIRBUS (BEIJING) ENGINEERING CENTRE COMPANY LIMITED, Beijing (CN)

( * ) Notice: Subject to any disclaimer, the term of this patent is extended or adjusted under 35 U.S.C. 154(b) by 621 days.

(21) Appl. No.: 17/862,127

(22) Filed: Jul. 11, 2022

(65) Prior Publication Data
US 2023/0010630 A1    Jan. 12, 2023

(30) Foreign Application Priority Data

Jul. 12, 2021 (CN) .......................... 202121595949.2

(51) Int. Cl.
*G05D 1/02* (2020.01)
*G05D 1/00* (2006.01)

(52) U.S. Cl.
CPC ........... *G05D 1/1064* (2019.05); *G05D 1/042* (2013.01)

(58) Field of Classification Search
CPC .... G05D 1/1064; G05D 1/042; G05D 1/0248; G05D 1/0083; G08G 5/21; G08G 5/51;
(Continued)

(56) References Cited

U.S. PATENT DOCUMENTS 9,581,692 B2 *  2/2017  Lamkin .................... G08G 5/51
10,761,538 B2 *  9/2020  Ball ........................ G05D 1/0248
(Continued)

FOREIGN PATENT DOCUMENTS

| CN | 107878767 | 4/2018 |
| EP | 3 121 763 | 1/2017 |
| EP | 3 531 400 | 8/2019 |

OTHER PUBLICATIONS

Zhou, "Analysis of the Principle of Multi-Target Tracking", <https://zhuanlan.zhihu.com/p/362715251>, published in Zhihu, Apr. 6, 2021, 12 pages (with English translation).
(Continued)

*Primary Examiner* — Masud Ahmed
(74) *Attorney, Agent, or Firm* — Nixon & Vanderhye P.C.

(57) ABSTRACT

An anti-collision system for an aircraft and an aircraft including the anti-collision system are disclosed including a sensor data processing unit configured to process data received from multiple sensors installed on a tow tug to detect objects around the aircraft, and output information about detected objects; a safeguarding box building unit configured to generate, based on an aircraft geometry database, a three-dimensional safeguarding box for the aircraft; and a risk assessment unit configured to update the safeguarding box based on data corresponding to different operation modes of the tow tug, calculate relative distances between the detected objects and the aircraft based on the information about the detected objects that is output from the sensor data processing unit, and determine whether there is a collision risk between the aircraft and an object, among the detected objects based on the updated safeguarding box. The system is configured to output an alarm or a warning when there is the collision risk.

24 Claims, 7 Drawing Sheets

(58) Field of Classification Search
CPC .... G08G 5/80; G01C 21/005; G01C 21/1652; G01C 21/20; G01S 17/86; G01S 17/933
See application file for complete search history.

(56) References Cited

U.S. PATENT DOCUMENTS

| | | | |
|---|---|---|---|
| 10,891,869 B1* | 1/2021 | McIntosh | G08G 5/51 |
| 2013/0003620 A1 | 1/2013 | Dame | |
| 2013/0321169 A1* | 12/2013 | Bateman | G01S 13/93 340/901 |
| 2015/0206439 A1* | 7/2015 | Marsden | B64D 47/02 701/301 |
| 2017/0134499 A1 | 5/2017 | Moyer et al. | |
| 2018/0096610 A1 | 4/2018 | Ray et al. | |
| 2019/0265714 A1* | 8/2019 | Ball | G06N 3/08 |

OTHER PUBLICATIONS

Search Report for FR1760989 dated Jul. 18, 2018, 7 pages.
Canada, "War On Wiring", Aerospace America (May 2017).

* cited by examiner

ANTI-COLLISION SYSTEM FOR AN AIRCRAFT AND AIRCRAFT INCLUDING THE ANTI-COLLISION SYSTEM

CROSS-REFERENCE TO RELATED APPLICATION

This application claims priority to and benefit of Chinese Patent Application No. 202121595949.2, filed on Jul. 12, 2021, which is hereby incorporated by reference as fully set forth herein.

TECHNICAL FIELD

The present disclosure generally relates to the field of aviation, and more particularly to surface operation safety of an aircraft.

BACKGROUND

The surface operation safety of an aircraft, especially obstacle detection, is becoming more and more important. Wingtip collision accidents often occur due to three factors: misjudgment of the distance between aircrafts by operators such as pilots or drivers of tow tug; inefficient communication among parties during the surface operation; and when an aircraft is not capable of broadcasting its position externally due to a systemic power failure (in this case, an ADS-B (Automatic Dependent Surveillance Broadcast) output cannot be obtained), the operator cannot be informed of information about the position of the aircraft. The digital anti-collision solution used for surface movement guidance of airport vehicles to improve operational safety relies on the historical records of accidents.

At present, several aircraft anti-collision solutions have been proposed.

A first solution is an ADS-B (Automatic Dependent Surveillance Broadcast) based collision prevention method. The solution includes aggregating 3D spatial data from ADS-B-out data of vehicles, determining a trajectory intent for each vehicle, identifying potential surface collisions, and presenting alarms associated with the potential surface collisions. The ADS-B-based solution is used to monitor vehicles surface movement guidance for anti-collision. However, a collision may also occur when one vehicle is under tow while the other is still. Moreover, the ADS-B position output sometimes has an error of meters or tens of meters.

A second solution is a radar-adaptive beam pattern for wingtip protection. An enhanced system for the second solution is proposed. The system uses adaptive steering of a radar beam pattern for coverage during aircraft turns. The radar sensor system is installed in an adaptive rack which would mechanically or electrically alter the radar sensor's beam pattern in order to adapt the radar sensor's FOV (Field of View) to cover the area of an anticipated aircraft wingtip trajectory. A forward-looking radar system for generating and/or presenting airport surface traffic information and an anti-collision radar for a taxiing machine have been developed. The anti-collision radar is able to be attached laterally to the fuselage and to detect obstacles on a collision course with a portion of the machine facing said radar. The radar includes at least one emission antennal channel emitting a wave of the FMCW (Frequency Modulated Continuous Wave) type and multiple reception antennal channels placed in the same plane, where the form of the wave and the field of angular coverage of the radar depend on the velocity of the machine. The radar-based solution has the advantages of low cost, resilience against low light and bad weather conditions. However, the radar is capable of detecting only objects with low spatial resolution, and cannot obtain much information about the spatial shape of the object.

The third solution is a vision-based anti-collision system, which utilizes an anti-collision system including a pair of video cameras mounted to a vertical stabilizer of the aircraft, a machine vision processing unit and a system to inform the pilots of a potential collision. A light projector in combination of a camera detecting the position of objects in the scene has been proposed. The light projector is further configured to control the intensity of the collimated beam of light. The vision-based solution is proposed for video analytics in the scene. However, the vision-based solution exhibits poor performance in low light and bad weather conditions.

A light detection and ranging (LiDAR)-based solution, having benefits of having a long range with a relatively wide field of view, is proposed. However, the solution has two critical problems unsolved. The first problem is that changes in reflectivity of surface due to wetness affects the performance of LiDAR sensors. The second problem is a poor resolution and a limited laser power due to laser safety, which in turn affect the performance of the sensor.

The current anti-collision solution for wing-tips is expensive due to following reasons: aircraft certification and compliance, an increased weight of the aircraft caused by sensors which are used only on the ground, and increased complexity in integration design of the aircraft.

SUMMARY

A brief summary of embodiments of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as preamble of a detailed description later.

It is an object of the present disclosure to provide an off-board cost-effective anti-collision solution for surface operations of an aircraft under tow.

According to an aspect of the present disclosure, an anti-collision system for an aircraft is provided, which includes: a sensor data processing unit configured to process data received from multiple sensors installed on a tow tug to detect objects around the aircraft, and output information about detected objects; a safeguarding box building unit configured to generate, based on an aircraft geometry database, a three-dimensional (3D) safeguarding box for the aircraft; and a risk assessment unit configured to update the safeguarding box based on data corresponding to different operation modes of the tow tug, calculate relative distances between the detected objects and the aircraft based on the information about the detected objects that is output from the sensor data processing unit, and determine whether there is a collision risk between the aircraft and an object, among the detected objects based on the updated safeguarding box. The anti-collision system is configured to output an alarm or a warning when there is the collision risk.

Preferably, the multiple sensors include one or more vision sensors, such as cameras, installed on the tow tug.

Preferably, the anti-collision system further includes an image stitching unit configured to synchronize images from the one or more vision sensors, and stitch the images to obtain a three-dimensional panoramic image.

Preferably, the risk assessment unit is configured to obtain, by using a perception algorithm, the different operation modes of the tow tug based on continuous attitude information of the tow tug and a relative azimuth between a central line of the tow tug and a central line of a belly of the aircraft, and update the safeguarding box in the different operation modes by using motion-related data. The different operation modes include a straight path, a turning path, and a curved path.

Preferably, the relative azimuth is obtained by using an image recognition method by calculating an angle between the central line of the belly of the aircraft and the central line of the tow tug.

Preferably, in a case of the turning path or the curved path, the motion-related data is a turning angular velocity of the aircraft, and the risk assessment unit is further configured to update the safeguarding box by using the turning angular velocity. The turning angular velocity is a change of an angular velocity of the aircraft, an azimuth of the aircraft is obtained based on an azimuth of the tow tug and the relative azimuth, and the azimuth of the tow tug is obtained by using a known appropriate image recognition method through an inertia measurement unit (IMU) among the multiple sensors.

Preferably, the multiple sensors further include a wheel speed sensor, and the continuous attitude information of the tow tug is obtained based on information from the one or more vision sensors, the IMU, and the wheel speed sensor.

Preferably, the multiple sensors include a LiDAR, and the risk assessment unit is further configured to calculate a relative distance between the aircraft and the object among the detected objects based on three-dimensional point cloud data from the LiDAR and the three-dimensional panoramic image, determine whether the relative distance is less than a range for the updated safeguarding box, and output the alarm if the relative distance is less than the range for the updated safeguarding box.

Preferably, the risk assessment unit is further configured to calculate a proximity rate of an object to be entering into the updated safeguarding box based on three-dimensional point cloud data from the LiDAR and the three-dimensional panoramic image. The proximity rate is a rate of change of a relative distance between the aircraft and the object among the detected objects over time, Preferably, the risk assessment unit is further configured to output the warning if the rate of change is greater than a predetermined threshold.

Preferably, the risk assessment unit is further configured to extract depth data related to the object among the detected objects by performing dense mapping on the three-dimensional panoramic image, and calculate the relative distance between the aircraft and the object among the detected objects based on the extracted depth data and the three-dimensional point cloud data.

Preferably, the risk assessment unit is further configured to calculate a relative distance between the aircraft and the object among the detected objects based on received automatic dependent surveillance broadcast data and absolute position information of the tow tug, determine whether the relative distance is less than a range for the updated safeguarding box, and output the alarm if the relative distance is less than the range for the updated safeguarding box.

Preferably, the risk assessment unit is further configured to calculate a proximity rate of an object to be entering into the safeguarding box based on received automatic dependent surveillance-broadcast data and absolute position information of the tow tug, to determine whether there is the collision risk with the object, and output the warning if there is the collision risk.

Preferably, the multiple sensors include a GPS (global positioning system), and the absolute position information of the tow tug is provided by the GPS.

Preferably, the risk assessment unit is further configured to correct the relative distance between the aircraft and the object among the detected objects based on the absolute position information of the tow tug.

Preferably, the anti-collision system further includes a local network. A driver of the tow tug, a pilot of the aircraft, a wing walker, and a maintenance engineering share information via the local network.

Preferably, the wing walker manually detects a collision risk of a tail fin of the aircraft, and informs other related personnel via the local network in a case that the collision risk is detected.

Preferably, the anti-collision system further includes a user interface configured to display the three-dimensional panoramic image, and present the warning or alarm provided by the risk assessment unit.

Preferably, the user interface is further configured to display the detected objects in the three-dimensional panoramic image, and simultaneously display the relative distances calculated by the risk assessment unit alongside the detected objects.

Preferably, the user interface is a display of a portable or stationary device, or a wearable device.

Preferably, the alarm or the warning may be provided through a user terminal, such as a microphone or a mobile device.

According to another aspect, an aircraft is provided, which includes the above anti-collision system.

According to another aspect of the present disclosure, an anti-collision method for an aircraft is provided, which includes: processing data received from multiple sensors installed on a tow tug to detect objects around the aircraft, and outputting information about detected objects; generating, based on an aircraft geometry database, a three-dimensional safeguarding box for the aircraft; updating the safeguarding box based on data corresponding to different operation modes of the tow tug, calculating relative distances between the detected objects and the aircraft based on the information about the detected objects, and determining whether there is a collision risk between the aircraft and an object, among the detected objects based on the updated safeguarding box; and outputting an alarm or a warning when there is the collision risk.

According to other aspects of the present disclosure, corresponding computer program codes, a computer readable storage medium, and a computer program product are further provided. The computer program product, when run by a processor, is capable of implementing the above anti-collision method for an aircraft.

The solution of the present disclosure has the advantages of adaptive perception for environment, enhanced safety and improved visibility.

In addition, the solution of the present disclosure is a cost-effective off-board solution that does not require any modification to existing aircrafts, and therefore does not increase the weight of the aircraft and cause complex integration for only ground functions. The solution of the present disclosure is compatible with any type of aircraft, fleet or route.

Other aspects of the embodiments of the present disclosure are given in the following description sections, where the detailed description is used to fully disclose rather than impose limitations on the preferred embodiments of the embodiments of the present disclosure.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, and these decisions may change as the embodiments differs.

Here, it should also be noted that in order to avoid obscuring the present disclosure due to unnecessary details, only components closely related to the solution according to the present disclosure are illustrated in the accompanying drawing, and other details having little relationship to the present disclosure are omitted.

In addition, when describing components of the present disclosure, terms such as first, second, A, B, (a), (b), and the like may be used herein. These terms are only used to distinguish one part from other parts, without limiting an attribute, an order, a sequence, and the like of the corresponding parts. When it is described that a component is "connected to" or "coupled to" another component, it should be construed that the one component may be directly "connected to" or "coupled to" the other component, or may be "connected to" or "couple to" another component via an intermediate component.

In order to improve the surface operation safety of an aircraft, and in particular to avoid wingtip collision between aircrafts, an anti-collision system is provided according to the present disclosure. In the following, an anti-collision system 100 for an aircraft according to an embodiment of the present disclosure is described in detail in combination with FIGS. 1 to 6.

Figure 1:
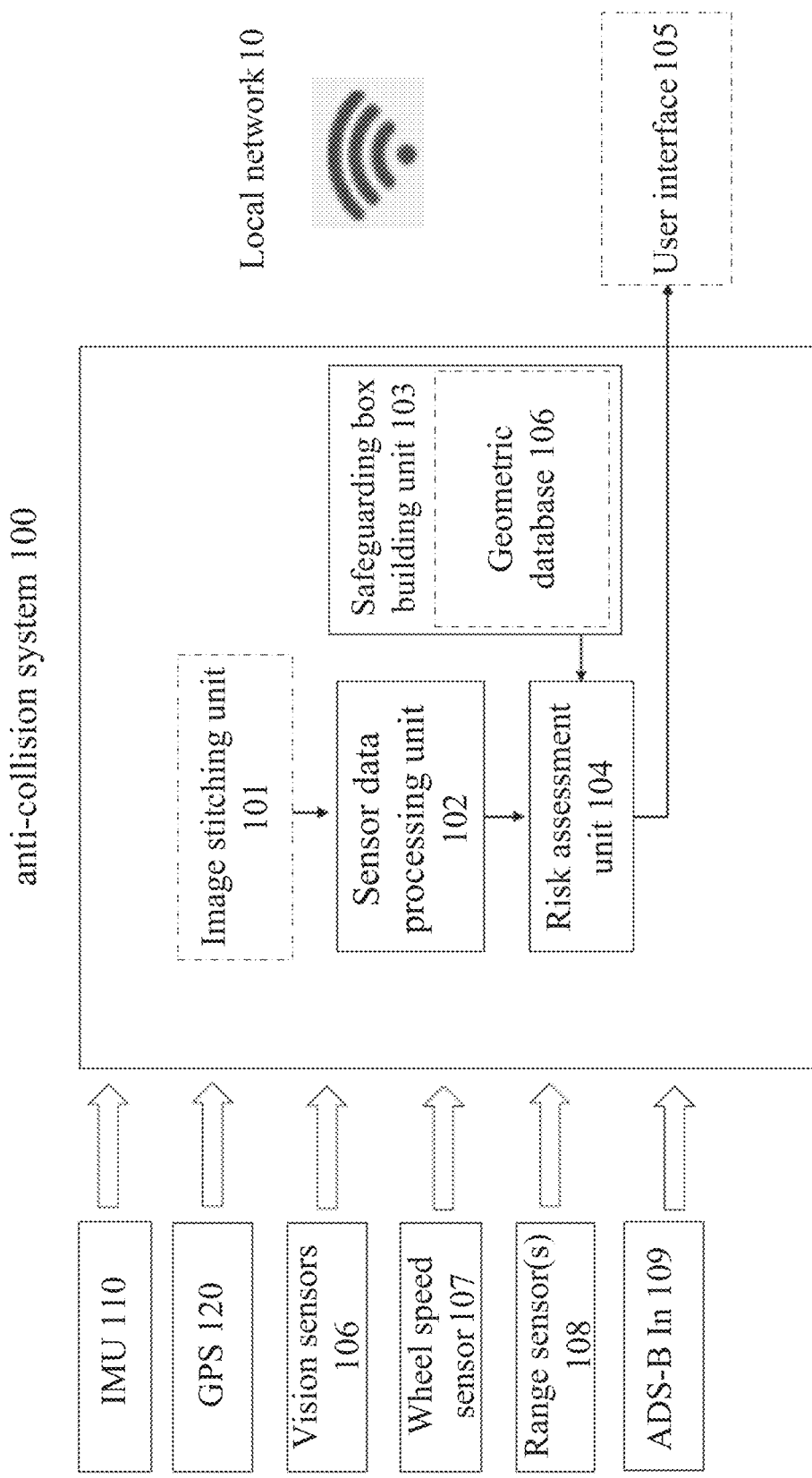
FIG. 1 is a block diagram of an anti-collision system for an aircraft according to an embodiment of the present disclosure.

FIG. 1 is a block diagram of an anti-collision system for an aircraft according to an embodiment of the present disclosure.

As shown in FIG. 1, the anti-collision system 100 includes a sensor data processing unit 102, a safeguarding box building unit 103 and a risk assessment unit 104.

The sensor data processing unit 102 processes data received from various sensors installed on a tow tug 30 to detect potential collision objects around the aircraft, and output information about detected objects. As shown in FIG. 1, the sensors may include, for example, vision sensors 106, a wheel speed sensor 107, range sensor(s) 108, an ADS-B In 109, an IMU (Inertial Measurement Unit) 110, and a GPS (Global Positioning System) 120.

Figure 2:
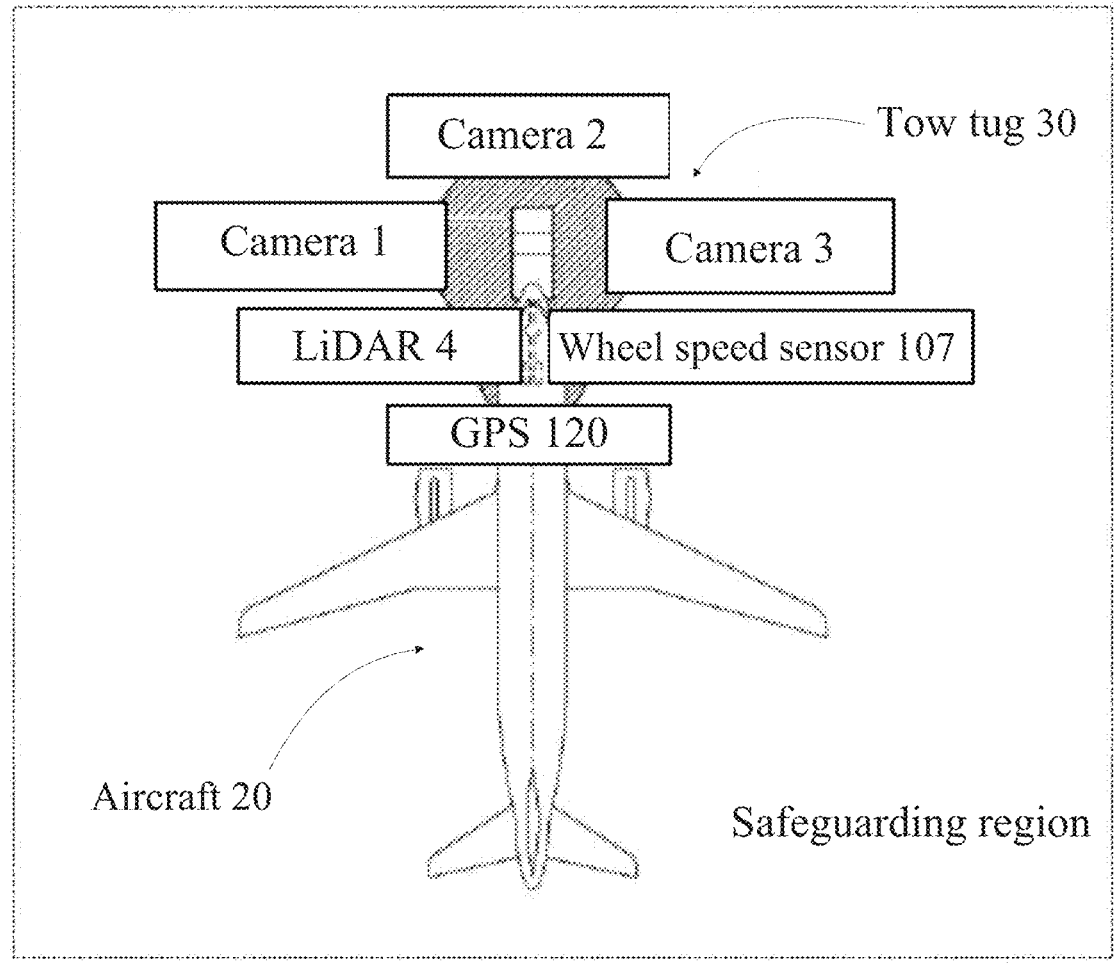
FIG. 2 schematically shows a tow tug provided with sensors and a 3D safeguarding box for an aircraft according to an embodiment of the present disclosure.

As shown in FIG. 2, the sensors are installed on the tow tug 30. The vision sensors 106 may include cameras 1, 2 and 3 as shown in FIG. 2, and the range sensor 108 may be a LiDAR 4 shown in FIG. 2.

It should be understood that, although three cameras are shown in FIG. 2, the present disclosure is not limited thereto. Instead, more or less cameras may be provided as needed. Further, positions on the tow tug 30 at which the cameras 1, 2 and 3 and the LiDAR 4 are installed are not limited to the positions shown in FIG. 2. Instead, the cameras 1, 2 and 3 and the LiDAR 4 may be installed on any appropriate positions as needed.

It should be understood that, the wheel speed sensor 107 may be installed, for example, a wheel of the tow tug 30.

According to various embodiment, the sensor data processing unit 102 may detect potential collision objects around the aircraft 20 based on data received from the ADS-B In 109, the cameras 1, 2 and 3, and/or the LiDAR 4, and provide, in a case that an object is detected, data related to the detected object to the risk assessment unit 104 for assessing whether there is a collision risk.

Figure 3:
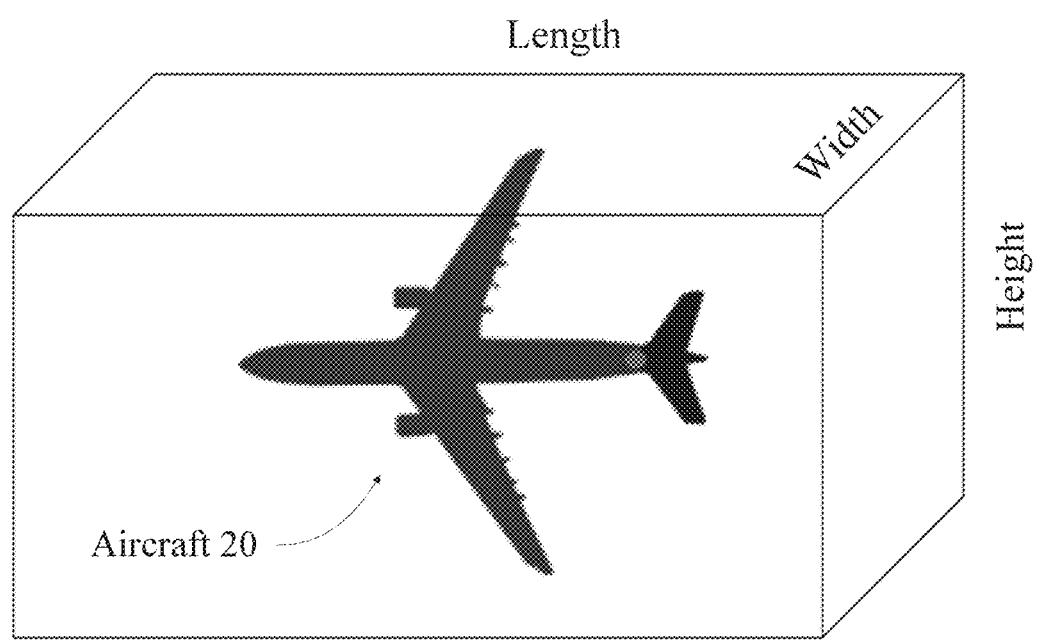
FIG. 3 schematically shows a tow tug provided with sensors and an aircraft under tow according to an embodiment of the present disclosure.

The safeguarding box building unit 103 is configured to generate, based on a geometry database 106 related to aircrafts, a 3D safeguarding box for the aircraft. The geometry database 106 includes geometric parameters, including lengths, heights and wingspan lengths, of various aircraft models. The 3D safeguarding box generated based on the geometric parameters of aircrafts is shown in FIG. 3. As an example, in case that an aircraft has a length of 34 m, a wingspan length of 34 m and a height of 12 m, the length, wingspan length and height of the 3D safeguarding box for the this aircraft model are the length, wingspan length and height of the aircraft model plus a safety threshold, such as 10 m. That is, the 3D safeguarding box for such an aircraft model has a length of 44 m, a width of 44 m and a height of 22 m.

It should be understood that, the safety threshold may be set to different values as needed.

It should be understood that, the safeguarding region shown in FIG. 2 is a projection of the 3D safeguarding box along the height direction.

Preferably, the anti-collision system 100 may further include an image stitching unit 101. The image stitching unit 101 synchronizes images captured by the cameras 10, 20 and 30, and stitches the images to obtain a 3D panoramic image. The 3D panoramic image may be provided to the risk assessment unit 104 through the sensor data processing unit 102 for collision risk assessment.

It should be understood that, the image stitching unit 101 may perform image stitching by using known appropriate image stitching techniques. Details on image stitching are not described herein in order not to obscure the present disclosure.

The risk assessment unit 104 is configured to update the 3D safeguarding box according to different operation modes of the tow tug 30, calculate relative distances between the detected objects and the aircraft 20 based on the information about the detected objects that is output from the sensor data processing unit 102, and determine whether there is a collision risk between the aircraft 20 and an object, among the detected objects based on the updated 3D safeguarding box.

According to an embodiment, the risk assessment unit 104 is configured to obtain, by using a perception algorithm, the different operation modes of the tow tug 30 based on continuous attitude information of the tow tug 30 and a relative azimuth between a central line of the tow tug 30 and a central line of a belly of the aircraft 20, and update the 3D safeguarding box in the different operation modes by using motion-related data. The different operation modes include a straight path, a turning path, and a curved path.

It should be understood that, the relative azimuth may be obtained by using a known appropriate image recognition method by calculating an angle between the central line of the belly of the aircraft 20 and the central line of the tow tug 30.

It should be understood that, the perception algorithm may be any appropriate algorithm in the conventional technology, such as simultaneous localization and mapping (SLAM). For example, the continuous attitude information of the tow tug 30 may be obtained by using the SLAM algorithm based on information from the cameras 1, 2 and 3, the IMU 110 and the wheel speed sensor 107.

Figure 4:
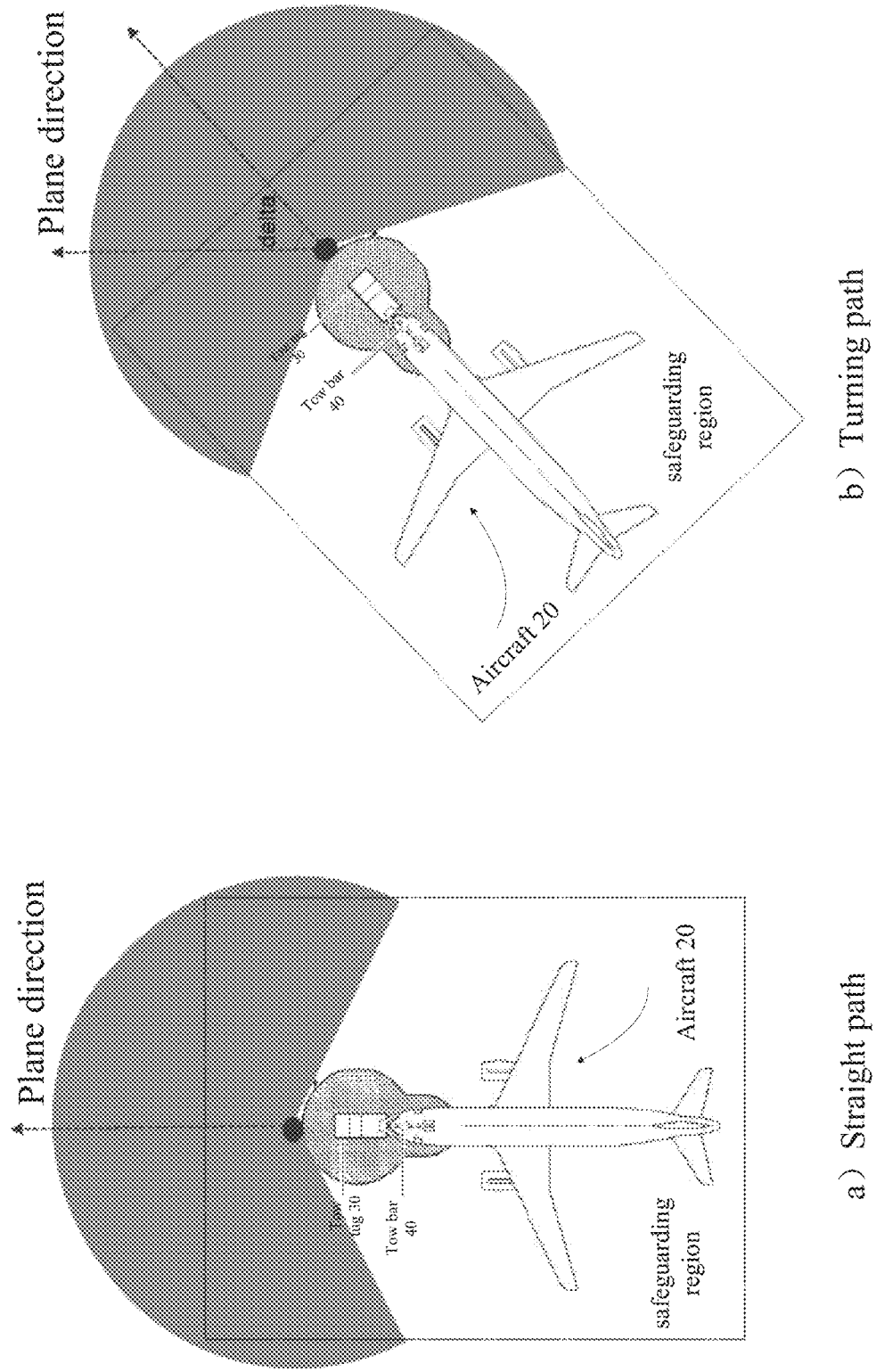
FIG. 4 schematically shows updating the safeguarding box based on data corresponding to different operation modes of the tow tug according to an embodiment of the present disclosure.

The left diagram a) of FIG. 4 shows a case where the aircraft 20 taxis along a straight line when towed by a tow bar 40 of the tow tug 30. The right diagram b) of FIG. 4 shows a case where the aircraft 20 taxis along a turning path or a curved path. In the case shown in the right diagram b) of FIG. 4, the risk assessment unit 104 may update the 3D safeguarding box by using, for example, a turning angular velocity delta of the aircraft 20.

It should be understood that, the turning angular velocity is a change of an angular velocity of the aircraft 20, and an azimuth of the aircraft 20 may be obtained based on an azimuth of the tow tug 30 and the above relative azimuth. The azimuth of the tow tug 30 may be obtained by using a known appropriate image recognition method through the IMU.

It should be understood that, in a case that the operation mode is the straight path, the risk assessment unit 104 may update the 3D safeguarding box by using, for example, an acceleration of the aircraft 20. The acceleration of the aircraft 20 may be obtained, for example, through the wheel speed sensor 107.

After the 3D safeguarding box is updated, the risk assessment unit 104 calculates a relative distance between the aircraft 20 and an object, among the detected objects, based on 3D point cloud data output from the LiDAR 4 and the 3D panoramic image provided by the image stitching unit 101, determine whether the relative distance is less than a range for the updated 3D safeguarding box, and output the alarm if the relative distance is less than the range for the updated 3D safeguarding box.

Figure 5:
FIG. 5 is a flow chart of calculating a relative distance between the aircraft and an object among the detected objects according to an embodiment of the present disclosure.

FIG. 5 is a flow chart of calculating a relative distance between the aircraft and an object among the detected objects according to an embodiment of the present disclosure.

As shown in FIG. 5, the risk assessment unit 104 may update the 3D safeguarding box based on, for example, data from the wheel speed sensor 107, images from cameras 1 to n, and absolute position information of the tow tug 30. As described above, the risk assessment unit 104 may obtain the absolute position information and the continuous attitude information of the tow tug 30 by using the SLAM algorithm based on the images from the cameras 1 to n, the absolute position information from the IMU 110 and/or the GPS 120, and the data from the wheel speed sensor 107, obtain the different operation modes of the tow tug 30 based on the continuous attitude information and the relative azimuth between the central line of the tow tug 30 and the central line of the belly of the aircraft 20, and update the 3D safeguarding box in the different operation modes by using motion-related data.

In addition, the image stitching unit 101 synchronizes images received from the cameras 1 to n, and stitches the images to obtain the 3D panoramic image around the aircraft 20. The risk assessment unit 104 extracts depth data related to an object among the detected objects by performing dense mapping on the 3D panoramic image received from the image stitching unit 101, performs dense depth completion based on the 3D point cloud data from the LiDAR 4 and the depth data related to the object among the detected objects, and calculate the relative distance between the aircraft 20 and the object among the detected objects based on the completed depth data. Then, the risk assessment unit 104 determines whether the calculated relative distance is less than the range for the updated 3D safeguarding box, and determines that there is the collision risk if the object among the detected objects is located within the updated 3D safeguarding box.

It should be understood that, the dense mapping is a known algorithm, and the present disclosure is not limited thereto. Instead, the depth information of the detected object may be obtained by using any other appropriate techniques.

Optionally, the risk assessment unit 104 may further correct the relative distance between the object among the detected objects and the aircraft 20 by using the absolute position information of the tow tug 30. The manner in which the relative distance is corrected by using the absolute position information is known to a person skilled in the art, and is not described in detail herein.

If the detected object is not located within the updated 3D safeguarding box, but is to be entering into the updated 3D safeguarding box, the risk assessment unit 104 calculates a proximity rate of the object based on the relative distance between the object and the aircraft:

$$\text{Proximity rate} = \Delta D / \Delta T,$$

where $\Delta T$ represents a defined time period, and $\Delta D$ represents a change of the relative distance over the time period.

If the proximity rate exceeds a certain threshold or a threshold range, the risk assessment unit 104 determines that there is the collision risk. In this case, the anti-collision system 100 outputs a warning. It should be understood that, the threshold or threshold range may be determined as needed.

For example, the risk assessment unit 104 may calculate a distance from the detected object to an edge of the updated 3D safety protection box based on the relative distance between the object and the aircraft. In a case that the distance from the object to the edge of updated 3D safety protection box is less than a predetermined threshold, it is determined that the object is to be entering into the 3D safety protection box. It should be understood that, the predetermined threshold may be set to an appropriate value as needed.

As an option, the risk assessment unit 104 may calculate the relative distance between the aircraft 20 and the object among the detected objects based on data received from the ADS-B In 109 and the absolute position information of the tow tug 30, and determines whether the relative distance is less than the range for the updated 3D safeguarding box. The anti-collision system 100 outputs the alarm in a case that the relative distance is less than the range for the updated 3D safeguarding box.

As an option, the risk assessment unit 104 is further configured to calculate the proximity rate of the object to be entering into the 3D safeguarding box based on data received from the ADS-B In 109 and the absolute position information of the tow tug 30, to determine whether there is a collision risk with the object. The anti-collision system 100 outputs the warning if there is the collision risk.

It is known that ADS-B is a terminology in the field of aviation, and indicates automatically obtaining parameters from related airborne equipment and reporting information of a position, an altitude, a speed, heading, an identification number, and the like of an aircraft to other aircrafts or a ground station, without manual operation or inquiry, such that a controller monitors a state of the aircraft. According to a transmission direction of aircraft broadcast information, ADS-B may be classified into ADS-B Out and ADS-B In. ADS-B Out indicates that an airborne ADS-B transmitter periodically sends position information and other additional information of the aircraft to other aircrafts or an air traffic controller on the ground. ADS-B In indicates that an ADS-B receiver of the aircraft receives information sent by an ADS-B transmitter of another aircraft or information sent by ADS-B ground station equipment.

Therefore, based on the data sent by the ADS-B In 109, the sensor data processing unit 102 may determine if there are other aircrafts around the aircraft 20, and may be informed of information on the other aircrafts.

Preferably, the anti-collision system 100 may further include a user interface 105, and present the alarm or warning and the 3D panoramic image on the user interface 105. The user interface 105 may be a display of a portable or stationary device, or a wearable device.

Preferably, the user interface is further configured to display the relative distance data provided by the risk assessment unit 104 alongside the detected objects in the 3D panoramic image.

Preferably, an audio alarm or warning may be provided by using a user terminal device. For example, the alarm or warning may be output through a microphone or a mobile device.

Figure 6:
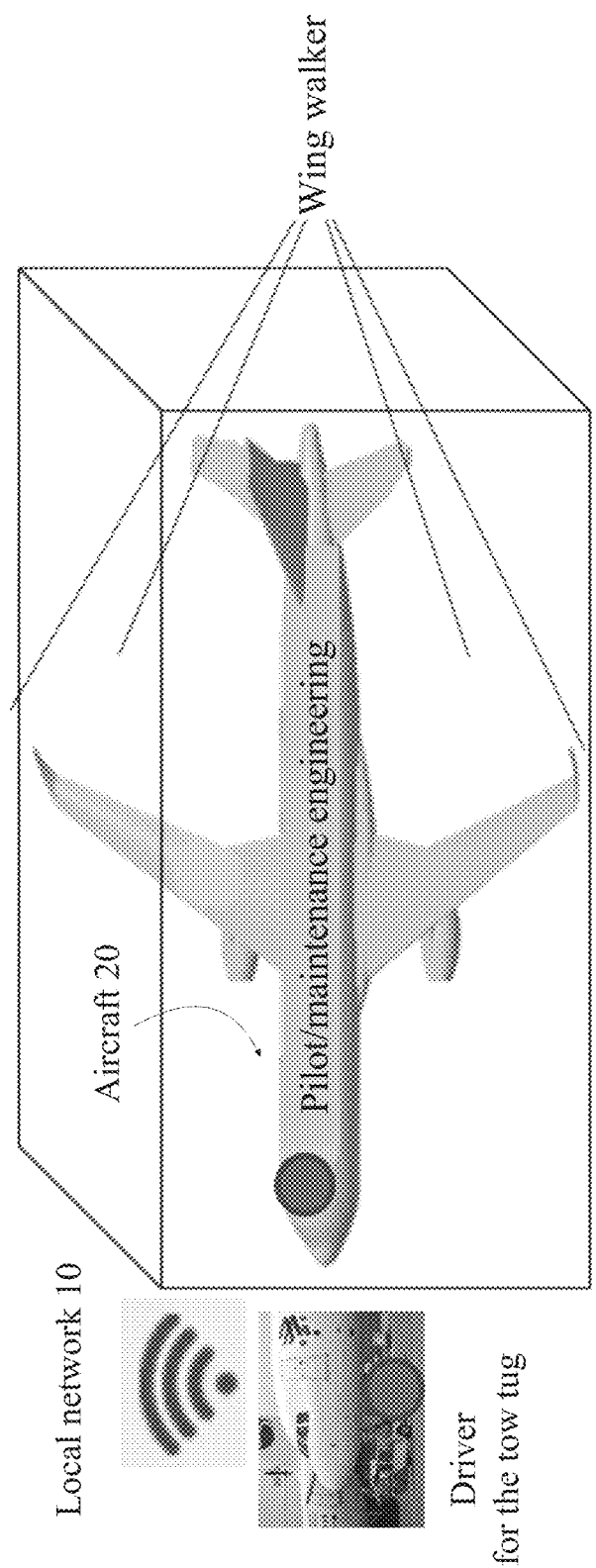
FIG. 6 schematically shows sharing a panoramic image around the aircraft and an alarm or warning among different personnel by using a local network.

Preferably, the anti-collision system 100 may further include a local network 10. As shown in FIG. 6, a driver of the tow tug, a pilot of the aircraft, a wing walker, and a maintenance engineering share information via the local network 10. For example, the wing walker informs, if a collision risk of a tail fin of the aircraft 20 is detected, the driver of the tow tug, the pilot of the aircraft, and/or the maintenance engineering of the collision risk via the local network 10.

In the above, the anti-collision system 100 according to the embodiments of the present disclosure is described in connection to FIGS. 1 to 6. As can be seen from the above, the anti-collision system according to the present disclosure achieves adaptive perception of the environment, enhanced safety, improved visibility and improved communication capability.

Figure 7:
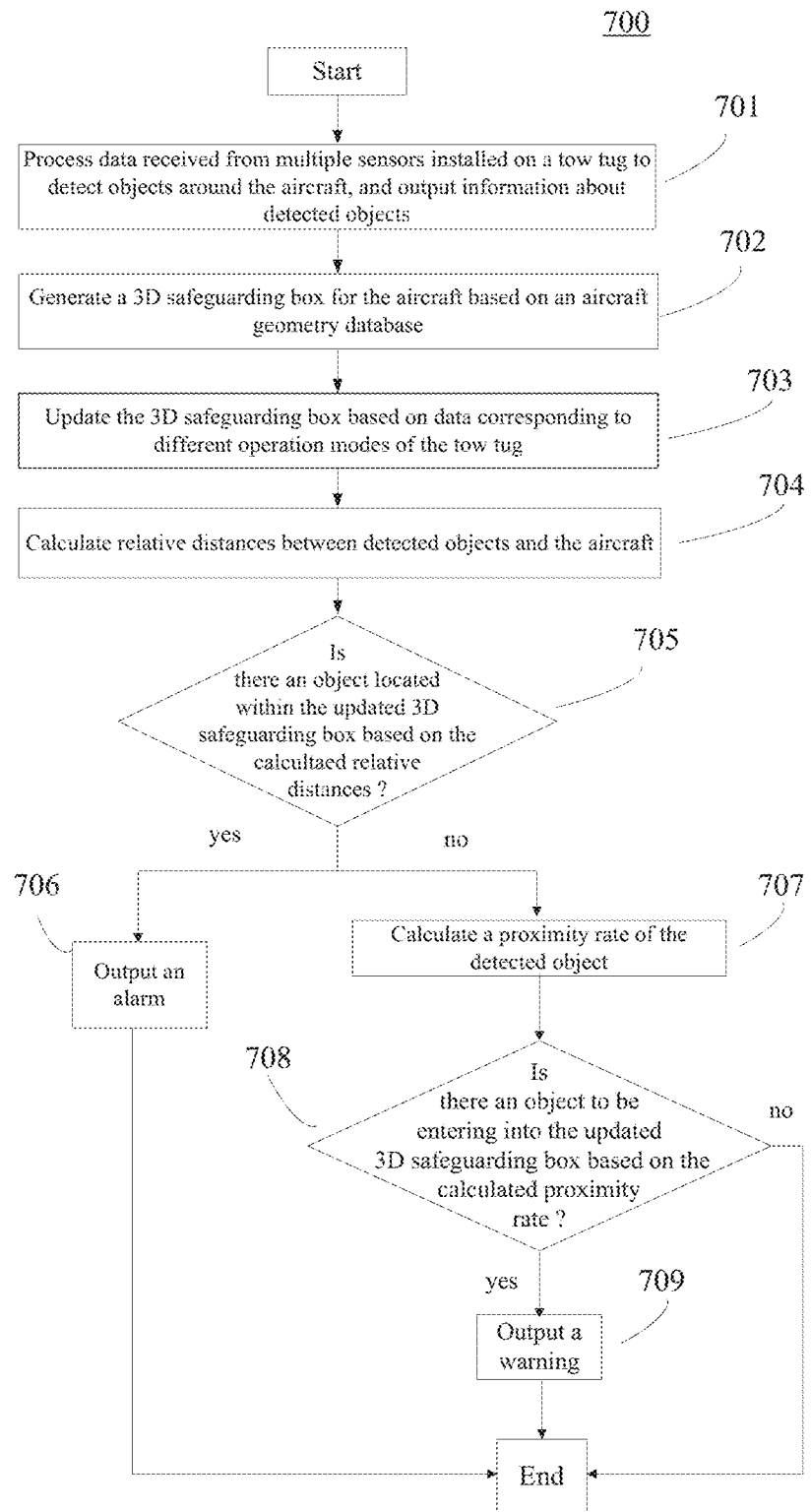
FIG. 7 is a flow chart of an anti-collision method for an aircraft according to an embodiment of the present disclosure.

FIG. 7 is a flow chart of an anti-collision method for an aircraft according to an embodiment of the present disclosure. In the following, the anti-collision method 700 according to the present disclosure is described in connection to FIG. 7.

First, in step 701, data received from multiple sensors installed on a tow tug is processed to detect objects around the aircraft, and information about detected objects is output. Specifically, the data received from the sensors installed on the tow tug 30 may be processed by using, for example, the sensor data processing unit 102 shown in FIG. 1, to detect potential collision objects around the aircraft 20, and the information about detected objects may be output by using, for example, the sensor data processing unit 102 shown in FIG. 1.

Next, in step 702, a 3D safeguarding box for the aircraft is generated based on an aircraft geometry database. Specifically, the 3D safeguarding box for the aircraft 20 may be generated by using, for example, the safeguarding box building unit 103 shown in FIG. 1.

Then, in step 703, the 3D safeguarding box is updated based on data corresponding to different operation modes of the tow tug. Specifically, the 3D safeguarding box may be updated by using, for example, the risk assessment unit 104 shown in FIG. 1, based on the data corresponding to different operation modes of the tow tug.

Next, in step 704, relative distances between detected objects and the aircraft are calculated. Specifically, the relative distances between the detected objects and the aircraft 20 may be calculated by using, for example, the risk assessment unit 104 shown in FIG. 1.

Next, in step 705, it is determined, based on the relative distances, whether an object among the detected objects is located within the updated 3D safeguarding box. Specifically, whether the object among the detected objects is located within the 3D safeguarding box may be determined based on the relative distance by using, for example, the risk assessment unit 104 shown in FIG. 1. It is determined that there is the collision risk if the object is located within the 3D safeguarding box, and an alarm is output in step 706, and then the method 700 ends.

If it is determined that the object is not located in the safeguarding box, it is determined in step 707 based on the relative distance whether the object among the detected objects is be entering into the 3D safeguarding box. Specifically, whether the object among the detected objects is to be entering into the 3D safeguarding box may be determined based on the relative distance by using, for example, the risk assessment unit 104 shown in FIG. 1. If the object is to be entering into the 3D safeguarding box, it is determined that there is the collision risk, and a warning is output in step 707, and then the method 700 ends.

If it is determined that the object among the detected objects is not to be entering into the safeguarding box, the method 700 ends.

It is to be noted that, the anti-collision method 700 shown in FIG. 7 corresponds to the anti-collision system 100 shown in FIG. 1. Therefore, relevant details of the steps of the anti-collision method 700 have been given in detail in the description of the anti-collision system 100 shown in FIG. 1, and will not be repeated here.

Based on the above description, the following examples are provided according to the embodiments of the present disclosure, however, the present disclosure is not limited thereto.

Example 1. An anti-collision system for an aircraft, including:

a sensor data processing unit configured to process data received from multiple sensors installed on a tow tug to detect objects around the aircraft, and output information about detected objects;

a safeguarding box building unit configured to generate, based on an aircraft geometry database, a three-dimensional safeguarding box for the aircraft; and a risk assessment unit configured to update the safeguarding box based on data corresponding to different operation modes of the tow tug, calculate relative distances between the detected objects and the aircraft based on the information about the detected objects that is output from the sensor data processing unit, and determine whether there is a collision risk between the aircraft and an object, among the detected objects based on the updated safeguarding box, where the anti-collision system is configured to output an alarm or a warning when there is the collision risk.

Example 2. The anti-collision system according to Example 1, where the multiple sensors include one or more vision sensors installed on the tow tug.

Example 3. The anti-collision system according to Example 1 or 2, further including an image stitching unit configured to synchronize images from the one or more vision sensors, and stitch the images to obtain a three-dimensional panoramic image.

Example 4. The anti-collision system according to any one of Examples 1 to 3, where the risk assessment unit is configured to obtain, by using a perception algorithm, the different operation modes of the tow tug based on continuous attitude information of the tow tug and a relative azimuth between a central line of the tow tug and a central line of a belly of the aircraft, and update the safeguarding box in the different operation modes by using motion-related data.

Example 5. The anti-collision system according to Example 4, where the relative azimuth is obtained by using an image recognition method by calculating an angle between the central line of the belly of the aircraft and the central line of the tow tug.

Example 6. The anti-collision system according to Example 5, where the different operation modes include a straight path, a turning path, and a curved path.

Example 7. The anti-collision system according to Example 6, where in a case of the turning path or the curved path, the motion-related data is a turning angular velocity of the aircraft, and the risk assessment unit is further configured to update the safeguarding box by using the turning angular velocity.

Example 8. The anti-collision system according to Example 7, where the turning angular velocity is a change of an angular velocity of the aircraft, and an azimuth of the aircraft is obtained based on an azimuth of the tow tug and the relative azimuth.

Example 9. The anti-collision system according to Example 8, where the multiple sensors include an inertia measurement unit, and the azimuth of the tow tug is obtained by using an image recognition method through the inertia measurement unit.

Example 10. The anti-collision system according to Example 9, where the multiple sensors further include a wheel speed sensor, and the continuous attitude information of the tow tug is obtained based on information from the one or more vision sensors, the inertia measurement unit, and the wheel speed sensor.

Example 11. The anti-collision system according to any one of Examples 1 to 10, where the multiple sensors include a LiDAR, and the risk assessment unit is further configured to calculate a relative distance between the aircraft and the object among the detected objects based on three-dimensional point cloud data from the LiDAR and the three-dimensional panoramic image, determine whether the relative distance is less than a range for the updated safeguarding box, and output the alarm if the relative distance is less than the range for the updated safeguarding box.

Example 12. The anti-collision system according to any one of Examples 1 to 10, where the multiple sensors include a LiDAR, and the risk assessment unit is further configured to calculate a proximity rate of an object to be entering into the updated safeguarding box based on three-dimensional point cloud data from the LiDAR and the three-dimensional panoramic image.

Example 13. The anti-collision system according to Example 12, where the proximity rate is a rate of change of a relative distance between the aircraft and the object among the detected objects over time, and the risk assessment unit is further configured to output the warning if the rate of change is greater than a predetermined threshold.

Example 14. The anti-collision system according to any one of Examples 11 to 13, where the risk assessment unit is further configured to extract depth data related to the object among the detected objects by performing dense mapping on the three-dimensional panoramic image, and calculate the relative distance between the aircraft and the object among the detected objects based on the extracted depth data and the three-dimensional point cloud data.

Example 15. The anti-collision system according to any one of Examples 1 to 14, where the risk assessment unit is further configured to calculate a relative distance between the aircraft and the object among the detected objects based on received automatic dependent surveillance broadcast data and absolute position information of the tow tug, determine whether the relative distance is less than a range for the updated safeguarding box, and output the alarm if the relative distance is less than the range for the updated safeguarding box.

Example 16. The anti-collision system according to any one of Examples 1 to 14, where the risk assessment unit is further configured to calculate a proximity rate of an object to be entering into the safeguarding box based on received automatic dependent surveillance-broadcast data and absolute position information of the tow tug, to determine whether there is the collision risk with the object, and output the warning if there is the collision risk.

Example 17. The anti-collision system according to Example 16, where the proximity rate is a rate of change of a relative distance between the aircraft and the object among of the detected objects over time, and the risk assessment unit is further configured to output the warning if the rate of change is greater than a predetermined threshold.

Example 18. The anti-collision system according to any one of Examples 15 to 17, where the multiple sensors include a global positioning system, and the absolute position information of the tow tug is provided by the global positioning system.

Example 19. The anti-collision system according to Example 18, where the risk assessment unit is further configured to correct the relative distance between the aircraft and the object among the detected objects based on the absolute position information of the tow tug.

Example 20. The anti-collision system according to any one of Examples 1 to 19, further including a local network, where a driver of the tow tug, a pilot of the aircraft, a wing walker, and a maintenance engineering share information via the local network.

Example 21. The anti-collision system according to Example 20, where the wing walker manually detects a collision risk of a tail fin of the aircraft, and informs other related personnel via the local network in a case that the collision risk is detected.

Example 22. The anti-collision system according to any one of Examples 1 to 21, further including a user interface configured to display the three-dimensional panoramic image, and present the warning or alarm provided by the risk assessment unit.

Example 23. The anti-collision system according to Example 22, where the user interface is further configured to display the detected objects in the three-dimensional panoramic image, and simultaneously display the relative distances calculated by the risk assessment unit alongside the detected objects.

Example 24. The anti-collision system according to Example 23, where the user interface is a display of a portable or stationary device, or a wearable device.

Example 25. An aircraft, including the anti-collision system according to any one of Examples 1 to 24.

Example 26. An anti-collision method for an aircraft, including:

processing data received from multiple sensors installed on a tow tug to detect objects around the aircraft, and outputting information about detected objects;

generating, based on an aircraft geometry database, a three-dimensional safeguarding box for the aircraft;

updating the safeguarding box based on data corresponding to different operation modes of the tow tug, calculating relative distances between the detected objects and the aircraft based on the information about the detected objects, and determining whether there is a collision risk between the aircraft and an object, among the detected objects based on the updated safeguarding box; and outputting an alarm or a warning when there is the collision risk.

Example 27. The anti-collision method according to Example 26, further including synchronizing images from one or more vision sensors, and stitching the images to obtain a three-dimensional panoramic image.

Example 28. The anti-collision method according to Example 26 or 27, where the updating the safeguarding box includes obtaining, by using a perception algorithm, the different operation modes of the tow tug based on continuous attitude information of the tow tug and a relative azimuth between a central line of the tow tug and a central line of a belly of the aircraft, and updating the safeguarding box in the different operation modes by using motion-related data.

Example 29. The anti-collision method according to Example 28, where the relative azimuth is obtained by using an image recognition method by calculating an angle between the central line of the belly of the aircraft and the central line of the tow tug.

Example 30. The anti-collision method according to any one of Examples 26 to 29, where the different operation modes include a straight path, a turning path, and a curved path.

Example 31. The anti-collision method according to Example 30, where in a case of the turning path or the curved path, the motion-related data is a turning angular velocity of the aircraft, and the anti-collision method further includes updating the safeguarding box by using the turning angular velocity.

Example 32. The anti-collision method according to Example 31, where the turning angular velocity is a change of an angular velocity of the aircraft, and an azimuth of the aircraft is obtained based on an azimuth of the tow tug and the relative azimuth.

Example 33. The anti-collision method according to Example 32, where the multiple sensors include an inertia measurement unit, and the azimuth of the tow tug is obtained by using an image recognition method through the inertia measurement unit.

Example 34. The anti-collision method according to any one of Examples 26 to 33, where the calculating the relative distances further includes calculate a relative distance between the aircraft and the object among the detected objects based on three-dimensional point cloud data from a LiDAR and the three-dimensional panoramic image, and the anti-collision method further includes outputting the alarm if the relative distance is less than the range for the updated safeguarding box.

Example 35. The anti-collision method according to any one of Examples 26 to 34, where the determining whether there is the collision risk further includes: calculate a proximity rate of an object to be entering into the updated safeguarding box based on three-dimensional point cloud data from a LiDAR and the three-dimensional panoramic image.

Example 36. The anti-collision method according to Example 35, where the proximity rate is a rate of change of a relative distance between the aircraft and the object among the detected objects over time, and the anti-collision method further includes outputting the warning if the rate of change is greater than a predetermined threshold.

Example 37. The anti-collision method according to any one of Examples 26 to 36, where the calculating the relative distances further includes extracting depth data related to the object among the detected objects by performing dense mapping on the three-dimensional panoramic image, and calculating a relative distance between the aircraft and the object among the detected objects based on the extracted depth data and the three-dimensional point cloud data.

Example 38. The anti-collision method according to any one of Examples 26 to 37, where the calculating the relative distances further includes calculating a relative distance between the aircraft and the object among the detected objects based on received automatic dependent surveillance broadcast data and absolute position information of the tow tug, and the anti-collision method further includes outputting the alarm if the relative distance is less than the range for the updated safeguarding box.

Example 39. The anti-collision method according to any one of Examples 26 to 38, where the determining whether there is the collision risk further includes calculating a proximity rate of an object to be entering into the safeguarding box based on received automatic dependent surveillance-broadcast data and absolute position information of the tow tug, to determine whether there is the collision risk with the object.

Example 40. The anti-collision method according to Example 39, where the proximity rate is a rate of change of a relative distance between the aircraft and the object among the detected objects over time, and the anti-collision method further includes outputting the warning if the rate of change is greater than a predetermined threshold.

Example 41. The anti-collision method according to any one of Examples 26 to 40, further including correcting the relative distance between the aircraft and the object among the detected objects based on the absolute position information of the tow tug.

Example 42. The anti-collision method according to any one of Examples 26 to 41, further including sharing information among a driver of the tow tug, a pilot of the aircraft, a wing walker, and a maintenance engineering via a local network.

Although the present disclosure is described above through the specific embodiments of the present disclosure, it should be understood that various modifications, improvements and equivalents may be made to the present disclosure by those skilled in the art within the scope and spirit of the attached claims. These modifications, improvements or equivalents should fall within the protection scope of the present disclosure.

The invention claimed is:

1. An anti-collision system for an aircraft being towed by a tow tug, comprising:
wherein the system is disposed on the tow tug and comprises a sensor data processing unit configured to process data received from a plurality of sensors installed on the tow tug to detect objects around the aircraft, and output information about detected objects;
a safeguarding box building unit configured to generate, based on an aircraft geometry database, a three-dimensional safeguarding box for the aircraft; and
a risk assessment unit configured to update the safeguarding box based on data corresponding to different operation modes of the tow tug, calculate relative distances between the detected objects and the aircraft based on the information about the detected objects that is output from the sensor data processing unit, and determine whether there is a collision risk between the aircraft and an object, among the detected objects based on the updated safeguarding box,
wherein the anti-collision system is configured to output an alarm or a warning when there is the collision risk, and
wherein the risk assessment unit is configured to obtain, by using a perception algorithm, the different operation modes of the tow tug based on continuous attitude information of the tow tug and a relative azimuth between a central line of the tow tug and a central line of a belly of the aircraft, and update the safeguarding box in the different operation modes by using motion-related data.

2. The anti-collision system according to claim 1, wherein the plurality of sensors comprise one or more vision sensors installed on the tow tug.

3. The anti-collision system according to claim 2, further comprising an image stitching unit configured to synchronize images from the one or more vision sensors, and stitch the images to obtain a three-dimensional panoramic image.

4. The anti-collision system according to claim 1, wherein the relative azimuth is obtained using an image recognition method by calculating an angle between the central line of the belly of the aircraft and the central line of the tow tug.

5. The anti-collision system according to claim 4, wherein the different operation modes comprise a straight path, a turning path, and a curved path.

6. The anti-collision system according to claim 5, wherein in a case of the turning path or the curved path, the motion-related data is a turning angular velocity of the aircraft, and the risk assessment unit is further configured to update the safeguarding box by using the turning angular velocity.

7. The anti-collision system according to claim 6, wherein the turning angular velocity is a change of an angular velocity of the aircraft, and an azimuth of the aircraft is obtained based on an azimuth of the tow tug and the relative azimuth.

8. The anti-collision system according to claim 7, wherein the plurality of sensors comprise an inertia measurement unit, and the azimuth of the tow tug is obtained by using an image recognition method through the inertia measurement unit.

9. The anti-collision system according to claim 8, wherein the plurality of sensors further comprise a wheel speed sensor, and the continuous attitude information of the tow tug is obtained based on information from the one or more vision sensors, the inertia measurement unit, and the wheel speed sensor.

10. The anti-collision system according to claim 3, wherein the plurality of sensors comprise a LiDAR, and the risk assessment unit is further configured to calculate a relative distance between the aircraft and the object among the detected objects based on three-dimensional point cloud data from the LiDAR and the three-dimensional panoramic image, determine whether the relative distance is less than a range for the updated safeguarding box, and output the alarm if the relative distance is less than the range for the updated safeguarding box.

11. The anti-collision system according to claim 3, wherein the plurality of sensors comprise a LiDAR, and the risk assessment unit is further configured to calculate a proximity rate of an object to be entering into the updated safeguarding box based on three-dimensional point cloud data from the LiDAR and the three-dimensional panoramic image.

12. The anti-collision system according to claim 11, wherein the proximity rate is a rate of change of a relative distance between the aircraft and the object among the detected objects over time, and the risk assessment unit is further configured to output the warning if the rate of change is greater than a predetermined threshold.

13. The anti-collision system according to claim 10, wherein the risk assessment unit is further configured to extract depth data related to the object among the detected objects by performing dense mapping on the three-dimensional panoramic image, and calculate the relative distance between the aircraft and the object among the detected objects based on the extracted depth data and the three-dimensional point cloud data.

14. The anti-collision system according to claim 1, wherein the risk assessment unit is further configured to calculate a relative distance between the aircraft and the object among the detected objects based on received automatic dependent surveillance broadcast data and absolute position information of the tow tug, determine whether the relative distance is less than a range for the updated safeguarding box, and output the alarm if the relative distance is less than the range for the updated safeguarding box.

15. The anti-collision system according to claim 1, wherein the risk assessment unit is further configured to calculate a proximity rate of an object to be entering into the safeguarding box based on received automatic dependent surveillance-broadcast data and absolute position information of the tow tug, to determine whether there is the collision risk with the object, and output the warning if there is the collision risk.

16. The anti-collision system according to claim 15, wherein the proximity rate is a rate of change of a relative distance between the aircraft and the object among the detected objects over time, and the risk assessment unit is further configured to output the warning if the rate of change is greater than a predetermined threshold.

17. The anti-collision system according to claim 14, wherein the plurality of sensors comprise a global positioning system, and the absolute position information of the tow tug is provided by the global positioning system.

18. The anti-collision system according to claim 17, wherein the risk assessment unit is further configured to correct the relative distance between the aircraft and the object among the detected objects based on the absolute position information of the tow tug.

19. The anti-collision system according to claim 1, further comprising a local network, wherein a driver of the tow tug, a pilot of the aircraft, a wing walker, and a maintenance engineering share information via the local network.

20. The anti-collision system according to claim 19, wherein the wing walker manually detects a collision risk of a tail fin of the aircraft, and informs other related personnel via the local network in a case that the collision risk is detected.

21. The anti-collision system according to claim 3, further comprising a user interface configured to display the three-dimensional panoramic image, and present the warning or alarm provided by the risk assessment unit.

22. The anti-collision system according to claim 21, wherein the user interface is further configured to display the detected objects in the three-dimensional panoramic image, and simultaneously display the relative distances calculated by the risk assessment unit alongside the detected objects.

23. The anti-collision system according to claim 22, wherein the user interface is a display of a portable or stationary device, or a wearable device.

24. An aircraft comprising the anti-collision system according to claim 1.

* * * * *